(12) United States Patent
Yamada et al.

(10) Patent No.: US 12,222,730 B2
(45) Date of Patent: Feb. 11, 2025

(54) CONTROL DEVICE, MOVING BODY, AND CONTROL METHOD

(71) Applicant: MITSUBISHI HEAVY INDUSTRIES, LTD., Tokyo (JP)

(72) Inventors: Masahiro Yamada, Tokyo (JP); Noritaka Yanai, Tokyo (JP); Kazutaka Shimizu, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 728 days.

(21) Appl. No.: 17/414,483

(22) PCT Filed: Feb. 20, 2020

(86) PCT No.: PCT/JP2020/006783
§ 371 (c)(1),
(2) Date: Jun. 16, 2021

(87) PCT Pub. No.: WO2020/175313
PCT Pub. Date: Sep. 3, 2020

(65) Prior Publication Data
US 2022/0057807 A1   Feb. 24, 2022

(30) Foreign Application Priority Data
Feb. 25, 2019   (JP) .................................. 2019-031490

(51) Int. Cl.
*G05D 1/00*   (2024.01)
(52) U.S. Cl.
CPC .................................. *G05D 1/0261* (2013.01)
(58) Field of Classification Search
USPC .......................................................... 701/41
See application file for complete search history.

(56) References Cited

U.S. PATENT DOCUMENTS 4,908,557 A * 3/1990 Sudare ................. G05D 1/0261
                                                        318/587
5,787,815 A * 8/1998 Andersson ............ B61L 25/021
                                                       105/199.2
(Continued)

FOREIGN PATENT DOCUMENTS

JP   S61-207273 A    9/1986
JP   H01-253007 A   10/1989
(Continued)

OTHER PUBLICATIONS

PCT/ISA/210, "International Search Report for International Application No. PCT/JP2020/006783," Apr. 14, 2020.
(Continued)

*Primary Examiner* — Hunter B Lonsberry
*Assistant Examiner* — Robert L Pinkerton
(74) *Attorney, Agent, or Firm* — HAUPTMAN HAM, LLP

(57) ABSTRACT

A control device controls travel direction of a traveling body that travels along a plurality of magnetic markers arranged with intervals therebetween on a track, the control device including: a first sensor for detecting the magnetic markers; a second sensor for detecting speed or acceleration; a first lateral position calculation unit for calculating a lateral position of the traveling body by a detection result from the first sensor, when the first sensor has detected a magnetic marker; a second lateral position calculation unit for calculating a lateral position of the traveling body by a detection result from the second sensor, when the first sensor is not detecting a magnetic marker; and a travel direction control unit for controlling the travel direction of the traveling body by the lateral position of the traveling body as calculated by the first lateral position calculation unit or the second lateral position calculation unit.

6 Claims, 10 Drawing Sheets

(56) References Cited

U.S. PATENT DOCUMENTS

| | | | | |
|---|---|---|---|---|
| 5,960,097 | A * | 9/1999 | Pfeiffer | G06V 10/255 |
| | | | | 342/357.65 |
| 6,032,110 | A * | 2/2000 | Ishihara | G01B 7/31 |
| | | | | 324/207.13 |
| 6,272,405 | B1 * | 8/2001 | Kubota | G01C 21/12 |
| | | | | 701/472 |
| 2009/0093924 | A1 * | 4/2009 | Aso | B60W 40/10 |
| | | | | 701/31.4 |
| 2009/0287376 | A1 * | 11/2009 | Aso | G05D 1/027 |
| | | | | 701/1 |
| 2013/0325244 | A1 * | 12/2013 | Wang | B25J 11/009 |
| | | | | 701/26 |
| 2016/0251835 | A1 * | 9/2016 | Kitajima | E02F 3/3663 |
| | | | | 701/50 |
| 2020/0133299 | A1 * | 4/2020 | Yamamoto | G01C 21/28 |
| 2021/0278859 | A1 * | 9/2021 | Yamamoto | G05D 1/0261 |
| 2022/0024504 | A1 * | 1/2022 | Batchelor | G01C 21/1652 |
| 2022/0075385 | A1 * | 3/2022 | Yamamoto | B62D 15/025 |

FOREIGN PATENT DOCUMENTS

| | | | |
|---|---|---|---|
| JP | 2003-208225 A | 7/2003 | |
| JP | 3763211 B2 | 4/2006 | |
| WO | WO-2006025455 A1 * | 3/2006 | B61L 23/047 |
| WO | 2018/181053 A1 | 10/2018 | |

OTHER PUBLICATIONS

PCT/ISA/237, "Written Opinion of the International Searching Authority for International Application No. PCT/JP2020/006783," Apr. 14, 2020.

* cited by examiner

CONTROL DEVICE, MOVING BODY, AND CONTROL METHOD

RELATED APPLICATION

Priority is claimed on Japanese Patent Application No. 2019-031490, filed Feb. 25, 2019, the content of which is incorporated herein by reference.

TECHNICAL FIELD

The present disclosure relates to a control device, a moving body, and a control method.

BACKGROUND ART

A method in which magnetic markers are discontinuously installed on a track and the magnetic marker is detected by a magnetic sensor installed on a vehicle is disclosed as a method of detecting the position of a vehicle in a lateral direction (a direction orthogonal to a travel direction) (Patent Document 1). The magnetic markers are detected in the form of a two-dimensional distribution in a direction crossing a movement direction in the configuration disclosed in Patent Document 1, so that a running position and a running direction are calculated. However, since the magnetic markers are discontinuously installed on the track in this configuration, a lateral position cannot be measured in a section where no magnetic marker is present.

Since the lateral position of a vehicle is easily predicted from the past state in a case where the vehicle runs in a stable environment, there is no problem in accuracy even though the lateral position of the vehicle is not measured in a section where no magnetic marker is present. However, since it is difficult to predict the lateral position of the vehicle in an environment where, for example, crosswind is generated and the strength of the crosswind is changed, it is difficult to control the steering of the vehicle.

For example, the following two methods are considered as a method of accurately detecting the lateral position of a vehicle or accurately controlling the steering of a vehicle even in a case where crosswind is generated, but each of the two methods has a subject. One method is a method in which magnetic markers are continuously installed. The cost of the magnetic markers and the installation cost of the magnetic markers are increased in this method. Further, the other method is a method in which a track is widened so that a vehicle does not come into contact with a structure even though an error in the detection of the lateral position of the vehicle occurs. In this case, the construction cost of the track is increased.

Further, the following two methods are known as a method of coping with a case where no magnetic marker is used and crosswind is generated. One method is a method in which wind pressure is detected and a vehicle is controlled on the basis of the detected wind pressure (Patent Document 2). In the configuration disclosed in Patent Document 2, the absolute position of the vehicle with respect to the middle of a track is not detected since a steering force for compensating wind pressure is merely output on the basis of the wind pressure. Since the lateral position of the vehicle cannot be directly detected in this configuration, the control of the vehicle is easily affected by an estimated error of the weight of the vehicle, an estimated friction error between a tire and a road surface, and the like. The other method is a method in which a marker, such as a white line on a track, is detected using a camera installed on a vehicle to detect the lateral position of the vehicle (Patent Document 3). In the method disclosed in Patent Document 3, it is not possible to detect the lateral position of the vehicle since it is difficult to detect the marker in rainy weather, dense fog, and the like.

CITATION LIST

Patent Document

[Patent Document 1] Japanese Unexamined Patent Application Publication No. 1-253007
[Patent Document 2] Japanese Unexamined Patent Application Publication No. 61-207273
[Patent Document 3] Japanese Patent No. 3763211

SUMMARY OF INVENTION

Technical Subject

The disclosure has been made in consideration of the above-mentioned circumstances, and an object of the disclosure is to provide a control device, a moving body, and a control method that can detect a lateral position even in rainy weather, dense fog, and the like.

Subject to be Solved

In order to solve the subjects, an aspect of the invention provides a control device that controls a running direction of a running body running along a plurality of magnetic markers arranged at intervals on a track. The control device includes a first sensor that detects the magnetic marker, a second sensor that detects a velocity or acceleration, a first lateral position calculation unit that calculates a lateral position of the running body on the basis of a detection result of the first sensor in a case where the first sensor detects the magnetic marker, a second lateral position calculation unit that calculates a lateral position of the running body on the basis of a detection result of the second sensor in a case where the first sensor does not detect the magnetic marker, and a running direction control unit that controls the running direction of the running body on the basis of the lateral position of the running body calculated by the first lateral position calculation unit or the second lateral position calculation unit.

Further, in the control device according to the aspect of the invention, the second lateral position calculation unit calculates the lateral position of the running body by subtracting a lateral velocity or lateral acceleration that depends on running of the running body on a curved portion of the track.

Furthermore, in the control device according to the aspect of the invention, the second lateral position calculation unit calculates a lateral velocity or lateral acceleration, which depends on running of the running body on a curved portion of the track, on the basis of a radius of curvature of the curved portion of the track and a running velocity of the running body, and calculates a lateral position of the running body by subtracting a lateral velocity or lateral acceleration, which depends on the running of the running body on the curved portion of the track, on the basis of the calculated lateral velocity or the calculated lateral acceleration.

Moreover, another aspect of the invention provides a moving body including the control device.

Further, another aspect of the invention provides a control method of controlling a running direction of a running body running along a plurality of magnetic markers arranged at intervals on a track. The running body includes a first sensor that detects the magnetic marker, a second sensor that detects a velocity or acceleration, a first lateral position calculation unit that calculates a lateral position of the running body on the basis of a detection result of the first sensor in a case where the first sensor detects the magnetic marker, a second lateral position calculation unit that calculates a lateral position of the running body on the basis of a detection result of the second sensor in a case where the first sensor does not detect the magnetic marker, and a running direction control unit; and the running direction of the running body is controlled by the running direction control unit on the basis of the lateral position of the running body calculated by the first lateral position calculation unit or the second lateral position calculation unit.

Advantageous Effects of Invention

According to the respective aspects of the invention, it is possible to detect a lateral position even in rainy weather, dense fog, and the like.

DESCRIPTION OF EMBODIMENTS

Figure 1:
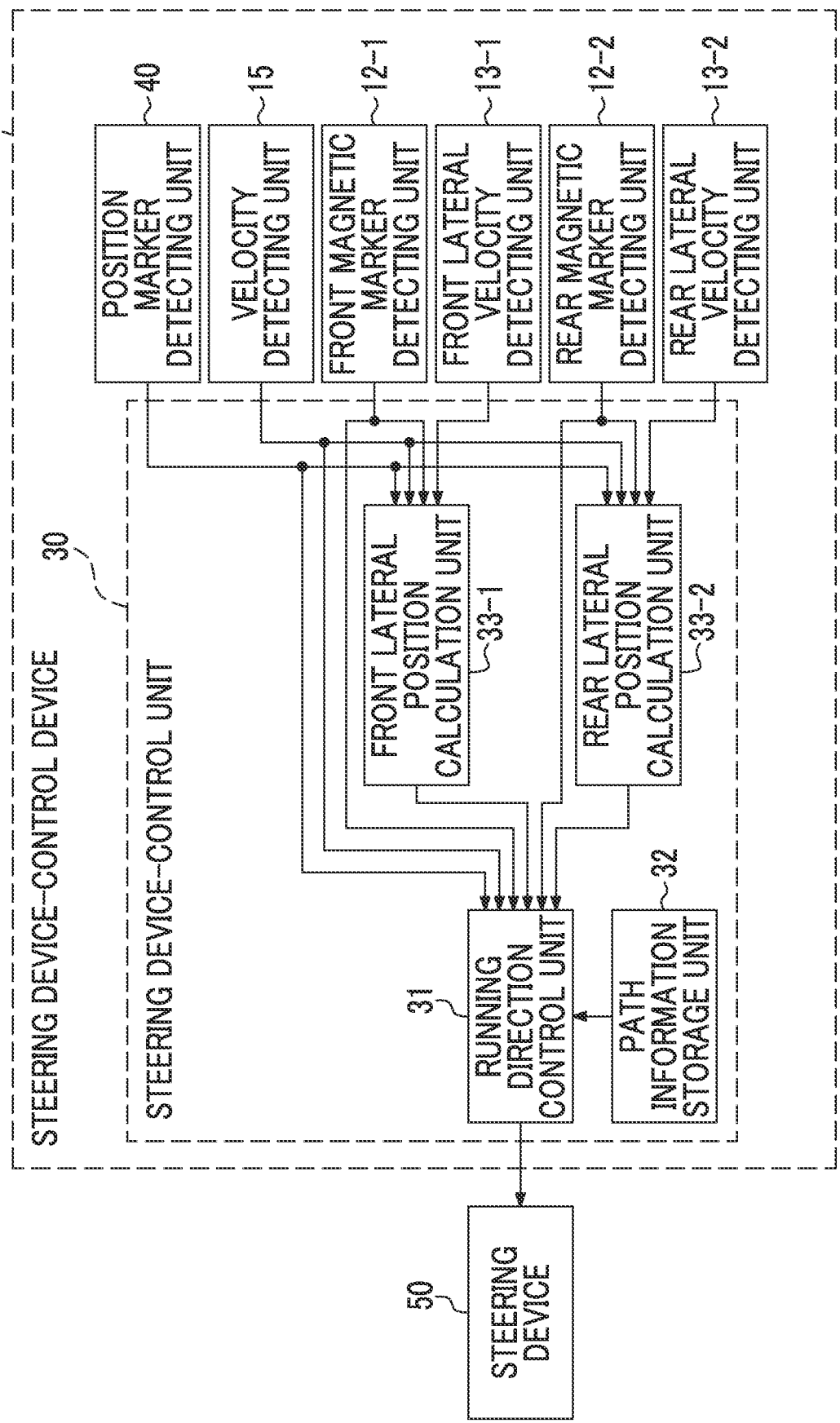
FIG. 1 is a block diagram showing a configuration example of a steering device-control device according to a first embodiment of the invention.

Embodiments of the invention will be described below with reference to the drawings. The same or corresponding elements will be denoted in the respective drawings by the same reference numerals and the description thereof will be appropriately omitted.

First Embodiment

Figure 2A:
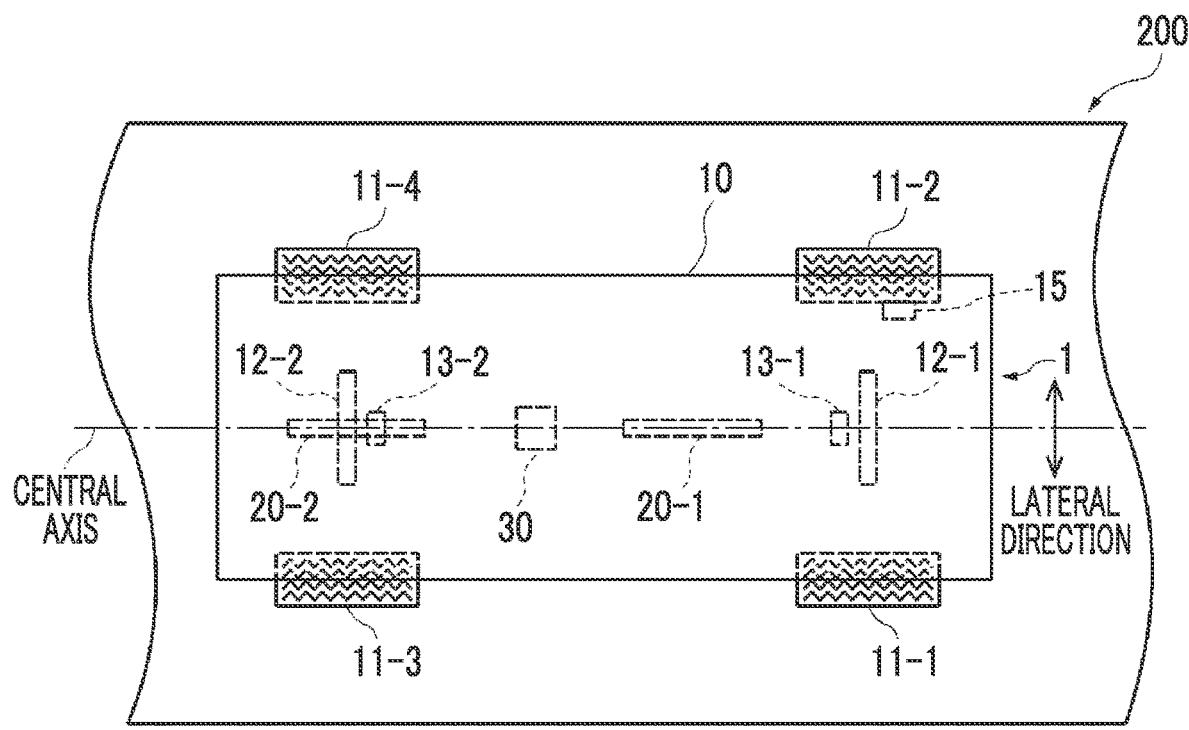
FIG. 2A is a schematic diagram showing an example in which a front lateral velocity detecting unit 13-1 and the like shown in FIG. 1 are mounted in a vehicle 10.

FIG. 1 is a block diagram showing a configuration example of a steering device-control device 1 according to a first embodiment of the invention. FIG. 2A is a top view schematically showing an example in which a front lateral velocity detecting unit 13-1 and the like shown in FIG. 1 are mounted in a vehicle 10, and FIG. 2B is a side view.

Figure 2B:
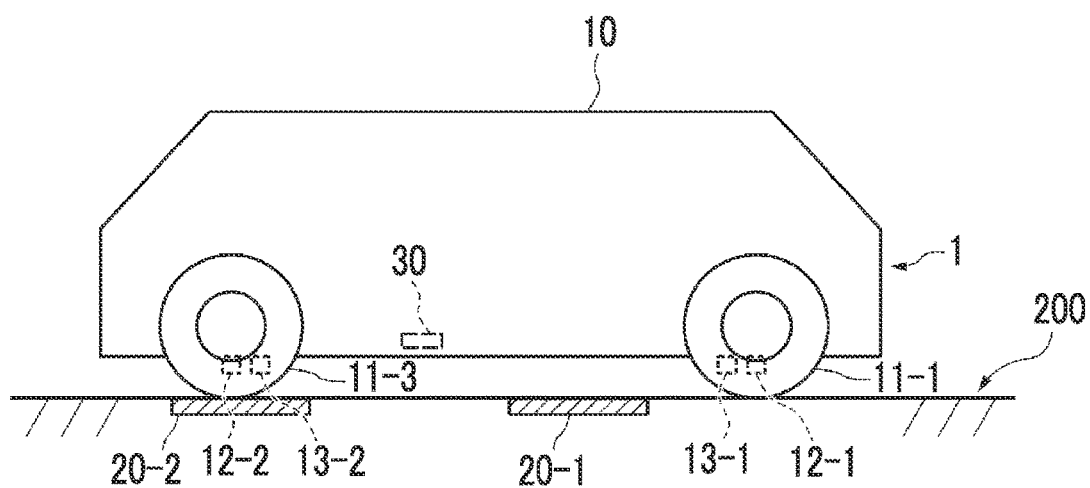
FIG. 2B is a schematic diagram showing the example in which the front lateral velocity detecting unit 13-1 and the like shown in FIG. 1 are mounted in the vehicle 10.

The steering device-control device 1 shown in FIG. 1 is mounted on the vehicle 10 shown in FIGS. 2A and 2B, and controls the running direction of the vehicle 10 by controlling the steering angle of a steering device 50 (not shown in FIGS. 2A and 2B) that steers all or some of a plurality of tires 11-1 to 11-4 of the vehicle 10. In this case, the tires 11-1 and 11-2 are front wheels and the tires 11-3 and 11-4 are rear wheels. The vehicle 10 is a running body that runs along a plurality of magnetic markers 20-1, 20-2, . . . (also collectively referred to as magnetic markers 20) arranged at intervals on a track 200, and is, for example, a vehicle for an automatic track steering type transportation system. The magnetic markers 20 are magnets discontinuously built in the track 200 so that the longitudinal direction of each magnetic marker is along the central axis of the track 200 (the path of the vehicle 10) (so that the longitudinal direction of each magnetic marker is positioned on the central axis of the track).

As shown in FIG. 1, the steering device-control device 1 includes a steering device-control unit 30, a position marker detecting unit 40, a velocity detecting unit 15, a front magnetic marker detecting unit 12-1, a front lateral velocity detecting unit 13-1, a rear magnetic marker detecting unit 12-2, and a rear lateral velocity detecting unit 13-2. The steering device-control unit 30 is a computer; includes a central processing unit (CPU), a storage unit, an input/output unit, and the like; and operates by executing a program stored in the storage unit using the CPU. In this case, the steering device-control unit 30 includes a running direction control unit 31, a path information storage unit 32, a front lateral position calculation unit 33-1, and a rear lateral position calculation unit 33-2 as functional components that are formed of combinations of hardware and software, such as programs. In the following description, the front lateral position calculation unit 33-1 and the rear lateral position calculation unit 33-2 may be collectively referred to as lateral position calculation units 33.

The position marker detecting unit 40 detects position markers that are installed at predetermined positions along the track 200. The position marker is, for example, a unit that transmits predetermined identification information using near field communication, and the position marker detecting unit 40 outputs identification information that is received from the position marker.

The velocity detecting unit 15 counts the rotation velocities of some or all of the tires 11-1 to 11-4, and calculates a count value per unit time, and outputs the count value as a running velocity. In the example shown in FIGS. 2A and 2B, the velocity detecting unit 15 detects a signal corresponding to the rotation of the tire 11-2, calculates a running velocity on the basis of the rotation velocity of the tire 11-2, and outputs the calculated running velocity.

The front magnetic marker detecting unit 12-1 is a magnetic sensor, is installed at a position facing the road surface of the track 200 on the front bottom portion of the vehicle 10 near the central axis of the vehicle 10, and includes a detection surface that has a longitudinal direction along, for example, a lateral direction of the vehicle 10 (a direction orthogonal to a travel direction on the road surface of the track 200). The front magnetic marker detecting unit 12-1 outputs a signal indicating whether or not the front magnetic marker detecting unit 12-1 is passing over the magnetic marker 20 (whether or not the front magnetic marker detecting unit 12-1 is detecting the magnetic marker 20) and a signal indicating a position on the detection surface at which the magnetic marker 20 is detected in a case where the front magnetic marker detecting unit 12-1 is detecting the magnetic marker 20.

The front lateral velocity detecting unit 13-1 is formed using, for example, a laser Doppler velocimeter. A laser Doppler velocimeter detects a velocity using the frequencies of light and darkness generated in a case where a highly reflective object passes through interference fringes generated by lasers crossing each other. A laser Doppler velocimeter applies two beams of laser light, which have been subjected to frequency modulation at different frequencies, to an object to be measured at predetermined incidence angles; receives light scattered from the object to be measured with a photodiode; and detects the velocity of the object to be measured on the basis of the Doppler frequency of scattered light generated due to the movement of the object to be measured. The front lateral velocity detecting unit 13-1 is installed at a position facing the road surface of the track 200 on the front bottom portion of the vehicle 10 near the central axis of the vehicle 10, detects the lateral velocity of the vehicle 10 using the road surface as an object to be measured, and outputs the detected lateral velocity. Alternatively, the front lateral velocity detecting unit 13-1 may calculate a lateral velocity by measuring, for example, a distance to a side wall (not shown) of the track 200 or a velocity, at which the vehicle approaches or recedes from the side wall, using, for example, a detector that detects a distance or a velocity with laser light.

The rear magnetic marker detecting unit 12-2 is the same magnetic sensor as the front magnetic marker detecting unit 12-1, and is installed at a position facing the road surface of the track 200 on the rear bottom portion of the vehicle 10 near the central axis of the vehicle 10. As with the front magnetic marker detecting unit 12-1, the rear magnetic marker detecting unit 12-2 outputs a signal indicating whether or not the rear magnetic marker detecting unit 12-2 is passing over the magnetic marker 20 (whether or not the rear magnetic marker detecting unit 12-2 is detecting the magnetic marker 20) and a signal indicating a position on the detection surface at which the magnetic marker 20 is detected in a case where the rear magnetic marker detecting unit 12-2 is detecting the magnetic marker 20.

The rear lateral velocity detecting unit 13-2 has the same configuration as the front lateral velocity detecting unit 13-1, is installed at a position facing the road surface of the track 200 on the rear bottom portion of the vehicle 10 near the central axis of the vehicle 10, detects the lateral velocity of the vehicle 10 using the road surface as an object to be measured, and outputs the detected lateral velocity.

In the steering device-control unit 30 shown in FIG. 1, the front lateral position calculation unit 33-1 calculates the lateral position of the vehicle 10 on the basis of the detection result of the front magnetic marker detecting unit 12-1 in a case where the front magnetic marker detecting unit 12-1 detects the magnetic marker 20, calculates the lateral position of the vehicle 10 on the basis of the detection result of the front lateral velocity detecting unit 13-1 in a case where the front magnetic marker detecting unit 12-1 does not detect the magnetic marker 20, and outputs the calculated lateral position. Here, the lateral position of the vehicle 10 is a deviation of the central axis of the vehicle 10 from the central axis of the track 200 (the central axis of a running path) (a distance between the central axis of the track 200 and the central axis of the vehicle 10). The example shown in FIG. 2A is a case where the lateral position of the vehicle 10 is zero (a distance between the central axis of the track 200 and the central axis of the vehicle 10 is zero). The lateral position of the vehicle 10 is represented by a value, such as ∞ mm to the right or ∞ mm to the left. In a case where the front magnetic marker detecting unit 12-1 detects the magnetic marker 20, the front lateral position calculation unit 33-1 calculates the lateral position of the vehicle 10 on the basis of information about a position on the detection surface of the front magnetic marker detecting unit 12-1 at which the magnetic marker 20 is detected. Further, in a case where the front magnetic marker detecting unit 12-1 does not detect the magnetic marker 20, the front lateral position calculation unit 33-1 calculates the lateral position of the vehicle 10 by integrating the velocity, which is detected by the front lateral velocity detecting unit 13-1, with respect to time.

Furthermore, as with the front lateral position calculation unit 33-1, the rear lateral position calculation unit 33-2 calculates the lateral position of the vehicle 10 on the basis of the detection result of the rear magnetic marker detecting unit 12-2 in a case where the rear magnetic marker detecting unit 12-2 detects the magnetic marker 20, calculates the lateral position of the vehicle 10 on the basis of the detection result of the rear lateral velocity detecting unit 13-2 in a case where the rear magnetic marker detecting unit 12-2 does not detect the magnetic marker 20, and outputs the calculated lateral position.

The path information storage unit 32 stores information representing the track 200 on which the vehicle 10 runs (also referred to as path information). The path information includes, for example, information representing the shape of the track 200, information representing the position of each position marker, information representing the position of each magnetic marker 20, information representing the command value of a running velocity at each predetermined position or in each predetermined section, information representing the predicted value of a passage time at each position, information representing the position of a station on the track 200, and the like.

The respective outputs of the position marker detecting unit 40, the velocity detecting unit 15, the front magnetic marker detecting unit 12-1, the rear magnetic unit 12-2, the front lateral position marker detecting calculation 33-1, and the rear lateral position calculation unit 33-2 are input to the running direction control unit 31; and the running direction control unit 31 determines the steering angle of the steering device 50 with reference to the path information stored in the path information storage unit 32 and outputs the determined steering angle to the steering device 50. In this case, the running direction control unit 31 determines a steering angle on the basis of the respective lateral positions of the vehicle 10 calculated by the front lateral position calculation unit 33-1 and the rear lateral position calculation unit 33-2 so that the lateral position becomes zero (so that a deviation of the central axis of the vehicle 10 from the central axis of the track 200 is eliminated); and controls the running direction of the vehicle 10.

Figure 3:
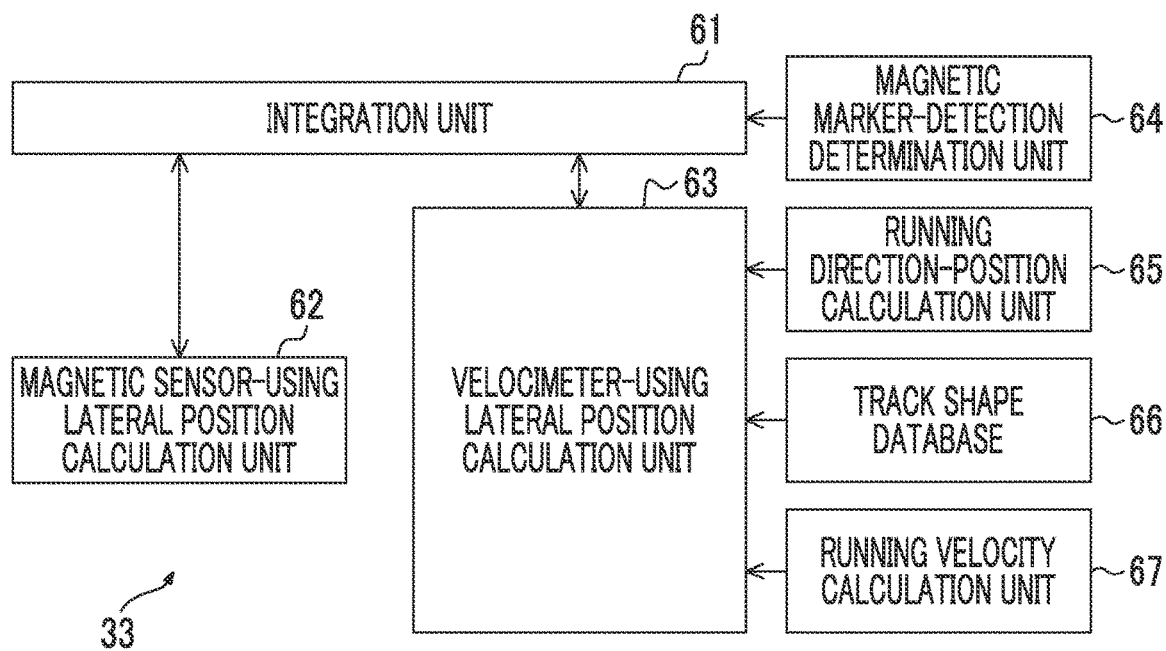
FIG. 3 is a block diagram showing a configuration example of a front lateral position calculation unit 33-1 and a rear lateral position calculation unit 33-2 shown in FIG. 1.
Figure 4:
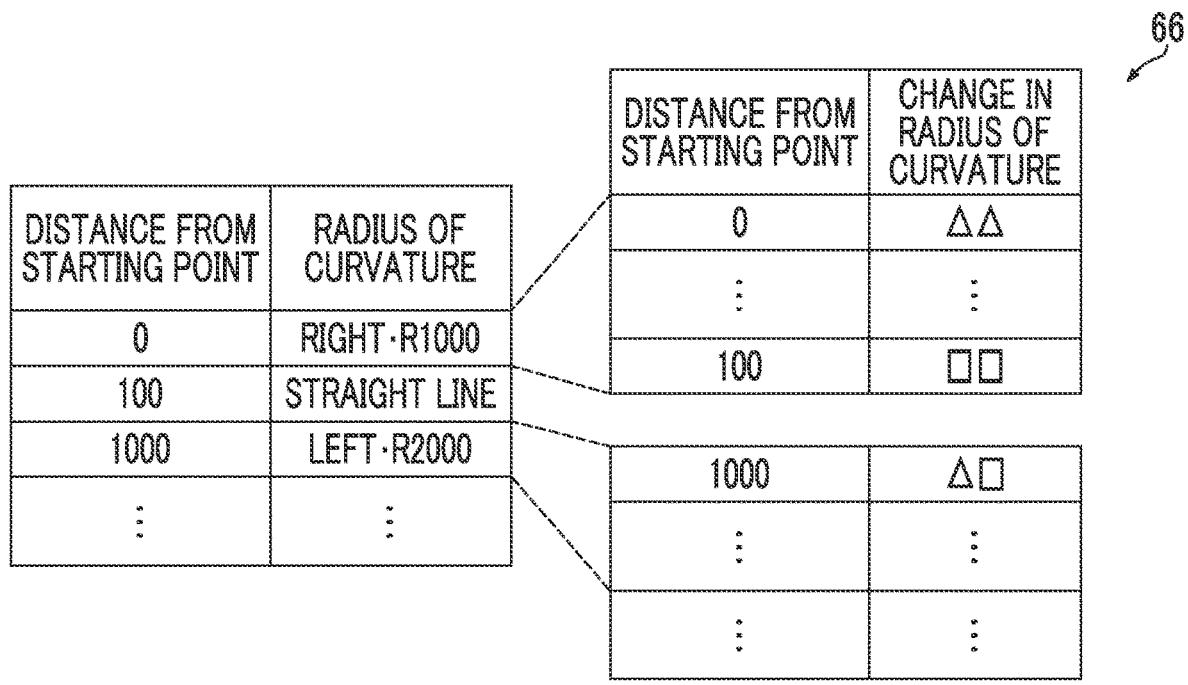
FIG. 4 is a schematic diagram showing a configuration example of a track shape database 66 shown in FIG. 3.
Figure 5:
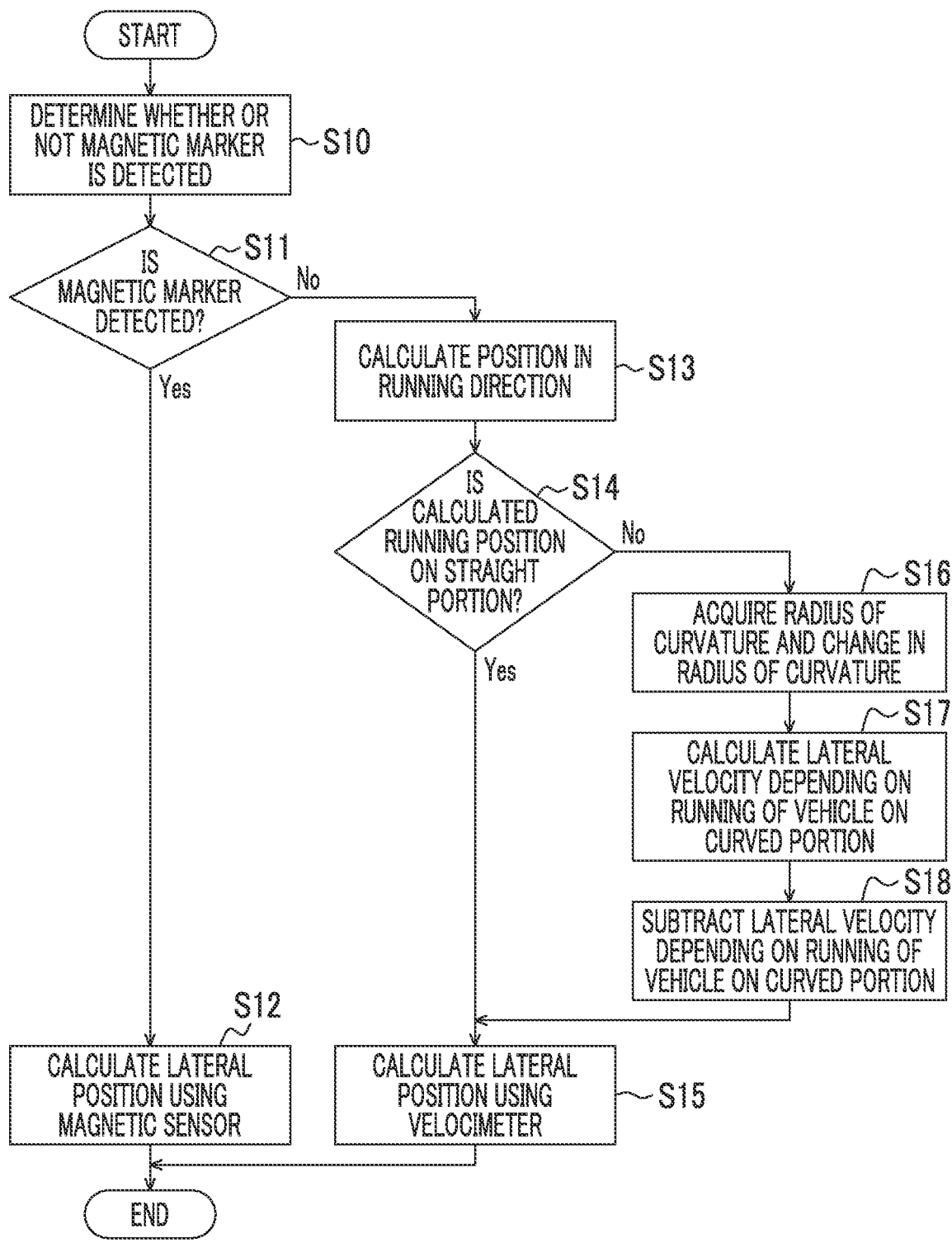
FIG. 5 is a flowchart showing an operation example of the front lateral position calculation unit 33-1 and the rear lateral position calculation unit 33-2 shown in FIG. 1.
Figure 6:
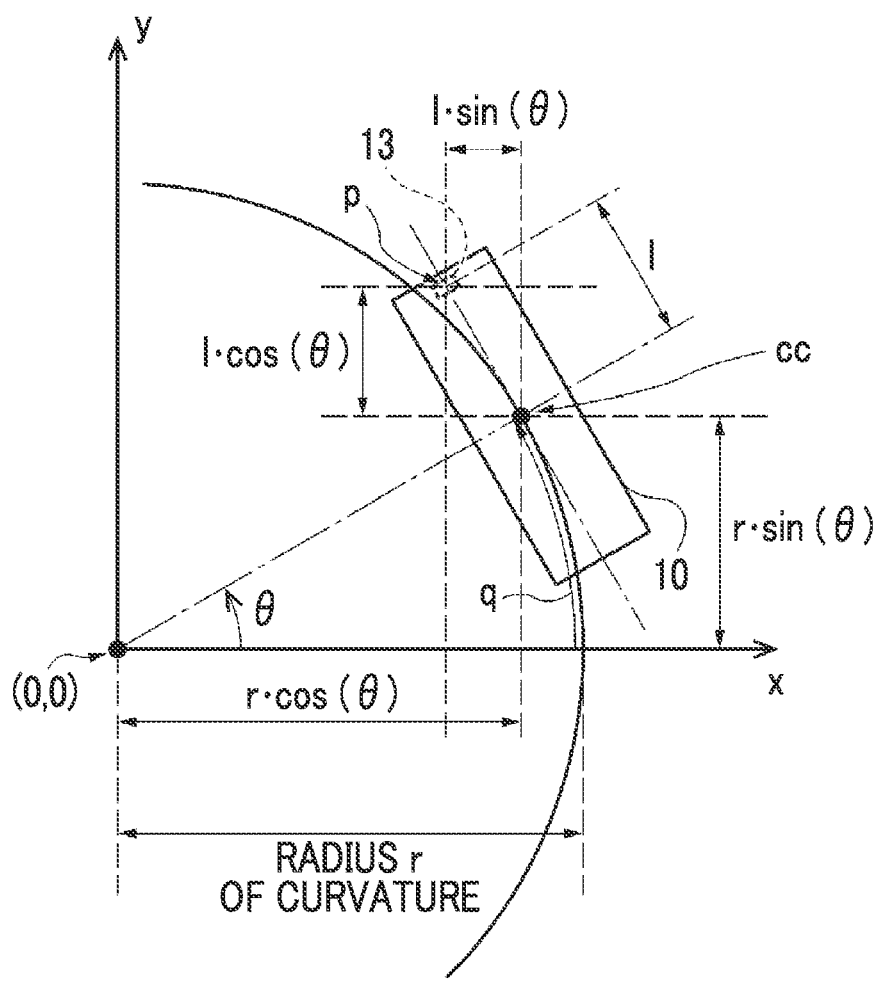
FIG. 6 is a schematic diagram illustrating the operation example shown in FIG. 5.

Next, a configuration example and an operation example of the front lateral position calculation unit 33-1 and the rear lateral position calculation unit 33-2 (hereinafter, also collectively referred to as the lateral position calculation units 33) shown in FIG. 1 will be described with reference to FIGS. 3 to 6. FIG. 3 is a block diagram showing the configuration example of the front lateral position calculation unit 33-1 and the rear lateral position calculation unit 33-2 (the lateral position calculation units 33). FIG. 4 is a schematic diagram showing a configuration example of a track shape database 66 shown in FIG. 3. FIG. 5 is a flowchart showing the operation example of the front lateral position calculation unit 33-1 and the rear lateral position calculation unit 33-2 (the lateral position calculation units 33) shown in FIG. 1. FIG. 6 is a schematic diagram (top view) illustrating the operation example shown in FIG. 5.

Since a lateral velocity is generated on a curved portion of the track 200 even though the vehicle runs in the middle of the track, the lateral position calculation unit 33 shown in FIG. 3 performs processing for correcting the measured lateral velocity using information about a position in the travel direction on the track 200. That is, the lateral position calculation unit 33 calculates the lateral position of the vehicle 10 by subtracting a lateral velocity, which depends on the running of the vehicle on the curved portion of the track 200, as necessary. In this case, the lateral position calculation unit 33 calculates a lateral velocity, which depends on the running of the vehicle on the curved portion of the track 200, on the basis of the radius of curvature of the curved portion of the track 200 and the running velocity of the vehicle 10; and calculates the lateral position of the vehicle 10 by subtracting a lateral velocity, which depends on the running of the vehicle on the curved portion of the track 200, as necessary on the basis of the calculated lateral velocity.

In the example shown in FIG. 3, the lateral position calculation unit 33 includes an integration unit 61, a magnetic sensor-using lateral position calculation unit 62, a velocimeter-using lateral position calculation unit 63, a magnetic marker-detection determination unit 64, a running direction-position calculation unit 65, a track shape database 66, and a running velocity calculation unit 67.

In a case where the magnetic marker 20 is detected on the basis of the determination result of the magnetic marker-detection determination unit 64, the integration unit 61 selects a lateral position calculated by the magnetic sensor-using lateral position calculation unit 62 and outputs the selected lateral position to the running direction control unit 31. In a case where the magnetic marker 20 is not detected, the integration unit 61 selects a lateral position calculated by the velocimeter-using lateral position calculation unit 63 and outputs the selected lateral position to the running direction control unit 31.

The magnetic sensor-using lateral position calculation unit 62 calculates the lateral position of the vehicle 10 on the basis of the output of the front magnetic marker detecting unit 12-1 or the rear magnetic marker detecting unit 12-2 (hereinafter, also collectively referred to as a magnetic marker detecting unit 12), and outputs the calculated lateral position.

The velocimeter-using lateral position calculation unit 63 calculates the lateral position of the vehicle 10 by integrating the lateral velocity with respect to time on the basis of the output of the front lateral velocity detecting unit 13-1 or the rear lateral velocity detecting unit 13-2 (hereinafter, also collectively referred to as a lateral velocity detecting unit 13), and outputs the calculated lateral position. In this case, the velocimeter-using lateral position calculation unit 63 calculates the lateral position of the vehicle 10 by subtracting a lateral velocity, which depends on the running of the vehicle on the curved portion of the track 200, as necessary with reference to the track shape database 66 on the basis of the output of the running direction-position calculation unit 65 and the output of the running velocity calculation unit 67.

The magnetic marker-detection determination unit 64 determines whether or not the magnetic marker detecting unit 12 is detecting the magnetic marker 20 on the basis of the output of the magnetic marker detecting unit 12, and outputs a determination result.

The running direction-position calculation unit 65 calculates the running position of the vehicle 10 on the track 200 on the basis of the output of the position marker detecting unit 40 and the output of the velocity detecting unit 15. The running direction-position calculation unit 65 calculates, for example, a distance from the starting point of the track 200 on the basis of the position information of each position marker output by the position marker detecting unit 40 and the time-integrated value of the running velocity output by the velocity detecting unit 15.

The track shape database 66 is a file in which each position on the track 200 and shape information of the track 200 (a radius of curvature and a change in a radius of curvature) are stored in association with each other. The track shape database 66 includes, for example, information in which a distance from the starting point of the track 200 is associated with the radius of curvature and a change in a radius of curvature as shown in FIG. 4. In the example shown in FIG. 4, the track shape database 66 includes information that represents, for example, a right-hand curve with a radius of curvature of 1000 m in a distance range of 0 to 100 m from the starting point, a straight line in a distance range of 100 m to 1000 m, a left-hand curve with a radius of curvature of 2000 m in a distance range of 1000 m or more, and the like.

The running velocity calculation unit 67 calculates the velocity of the vehicle 10 in the running direction (for example, the average velocity of the vehicle 10 in the running direction) at a predetermined time on the basis of the output of the velocity detecting unit 15.

Next, the operation example of the lateral position calculation unit 33 shown in FIG. 3 will be described with reference to FIG. 5. Processing shown in FIG. 5 is repeatedly performed at predetermined time intervals. In a case where the processing shown in FIG. 5 is started, the magnetic marker-detection determination unit 64 of the lateral position calculation unit 33 determines whether or not the magnetic marker 20 is detected on the basis of the output of the magnetic marker detecting unit 12 (Step S10).

In a case where the magnetic marker 20 is detected (in the case of "Yes" in Step S11), the magnetic sensor-using lateral position calculation unit 62 calculates the lateral position of the vehicle 10 on the basis of the output of the magnetic marker detecting unit 12 and outputs the calculated lateral position (Step S12).

On the other hand, in a case where the magnetic marker 20 is not detected (in the case of "No" in Step S11), the running direction-position calculation unit 65 calculates the running position of the vehicle 10 (Step S13). After that, the velocimeter-using lateral position calculation unit 63 determines whether or not the calculated running position is on a straight line with reference to the track shape database 66 on the basis of the calculated running position (Step S14). In a case where the calculated running position is on the straight line (in the case of "Yes" in Step S14), the velocimeter-using lateral position calculation unit 63 calculates the lateral position of the vehicle 10 on the basis of the output of the lateral velocity detecting unit 13 and outputs the calculated lateral position (Step S15).

On the other hand, in a case where the calculated running position is not on the straight line (in the case of "No" in Step S14), the velocimeter-using lateral position calculation unit 63 acquires information representing a radius of curvature and a change in a radius of curvature from the track shape database 66 on the basis of the calculated running position (Step S16). After that, the velocimeter-using lateral position calculation unit 63 calculates a lateral velocity depending on the running of the vehicle on a curved portion (Step S17).

In Step S17, the velocimeter-using lateral position calculation unit 63 calculates a lateral velocity, which is generated on the curved portion, as follows.

In a case where the vehicle 10 runs on a curve with a radius r of curvature as shown in FIG. 6, a distance between a center cc of the vehicle and the lateral velocity detecting unit 13 is denoted by 1, the center of the curve is represented by (0,0), and the angle of the vehicle 10 viewed from the center (0,0) of the curve is denoted by e, a position p→(→ means a vector) of the lateral velocity detecting unit 13 is as follows.

$$\vec{p} = (r \cdot \cos(\theta) - l \cdot \sin(\theta), r \cdot \sin(\theta) + l \cdot \cos(\theta))$$

In a case where this expression is differentiated with a time t, the following expression is obtained.

$$\frac{d\vec{p}}{dt} = \left(\frac{dr}{dt} \cdot \cos(\theta) - r \cdot \sin(\theta) \cdot \frac{d\theta}{dt} - l \cdot \cos(\theta) \cdot \frac{d\theta}{dt}, \right.$$
$$\left. \frac{dr}{dt} \cdot \sin(\theta) + r \cdot \cos(\theta) \cdot \frac{d\theta}{dt} - l \cdot \sin(\theta) \cdot \frac{d\theta}{dt}\right)$$

Here, in a case where a position satisfying "θ=0" is used as a target, a lateral velocity $v_\theta$ is as follows.

$$v_\theta = \frac{dr}{dt} - l \cdot \frac{d\theta}{dt} \quad \text{Expression (1)}$$

In a case where the position of the vehicle in the travel direction along the curve is denoted by q, the following expression is obtained and v is a running velocity.

$$q = r \cdot \theta$$
$$\frac{dq}{dt} = \frac{dr}{dt} \cdot \theta + r \cdot \frac{d\theta}{dt} = v$$

In a case where "θ=0" is satisfied, the following expression is obtained and corresponds to a running velocity.

$$v = \frac{dq}{dt} = r \cdot \frac{d\theta}{dt}$$

Expression (2) is obtained from Expression (1).

$$v_\theta = \frac{dr}{dq} \cdot \frac{dq}{dt} - l \cdot \frac{d\theta}{dt} \quad \text{Expression (2)}$$

$$= \left(\frac{dr}{dq} - \frac{l}{r}\right) \cdot v$$

In a case where a position on the track is known, a change dr/dq in a radius of curvature and a radius r of curvature can be obtained and a running velocity v can also be calculated. Accordingly, the lateral velocity $v_\theta$ can be calculated from Expression (2). A running velocity may be measured using either the rotation velocity of the tire or a laser Doppler velocimeter.

After that, the velocimeter-using lateral position calculation unit 63 calculates a lateral velocity, which is corrected by the lateral velocity depending on the running of the vehicle on the curved portion, by subtracting the lateral velocity, which is calculated in Step S17 and depends on the running of the vehicle on the curved portion, from the lateral velocity detected by the lateral velocity detecting unit 13 (Step S18). Then, the velocimeter-using lateral position calculation unit 63 calculates the lateral position of the vehicle 10 on the basis of the corrected lateral velocity and outputs the calculated lateral position (Step S15).

As described above, according to the first embodiment, a lateral position can be detected without the use of an optical camera. Therefore, a lateral position can be accurately detected even in rainy weather, dense fog, and the like. Further, according to the first embodiment, a change in a lateral position caused by crosswind can be calculated even in rainy weather and the like and on a curved portion.

Furthermore, in the first embodiment, the magnetic markers 20 are intermittently installed on the track 200, a lateral position is detected by the magnetic marker detecting unit 12 at a position where the magnetic marker 20 is installed, and a lateral position is calculated using the lateral velocity detecting unit 13 in a section where no magnetic marker 20 is installed. Accordingly, it is possible to reduce the installation cost of the magnetic markers 20 and to reduce the accumulated error of a position occurring in a section where no magnetic marker 20 is installed.

Moreover, in the first embodiment, on a curved portion of the track 200, a lateral position is calculated from Expression (2) by subtracting a lateral velocity $v_\theta$ during the running of the vehicle along a curve, which is determined from the shape of the track and a running velocity, from a velocity measured by a laser Doppler velocimeter or the like. Accordingly, it is possible to reduce a position error caused by a lateral velocity that is generated in a case where the vehicle is running along a curve even though the vehicle 10 is not pushed in the lateral direction by crosswind.

Further, since the lateral velocity detecting units 13 are installed on the vehicle 10 in the first embodiment, an increase in the cost of the track 200 does not occur.

Furthermore, since a laser Doppler velocimeter is more robust against environmental changes, such as rainy weather, than cameras, the laser Doppler velocimeter can make a stable detection.

The position calculation errors of the lateral velocity detecting units 13 are accumulated in a section where no magnetic marker is installed. However, since the magnetic marker detecting unit 12 and the lateral velocity detecting unit 13 are selectively used in the first embodiment, it is possible to remove an accumulated error in the section where the magnetic markers 20 are installed.

Second Embodiment

Figure 7:
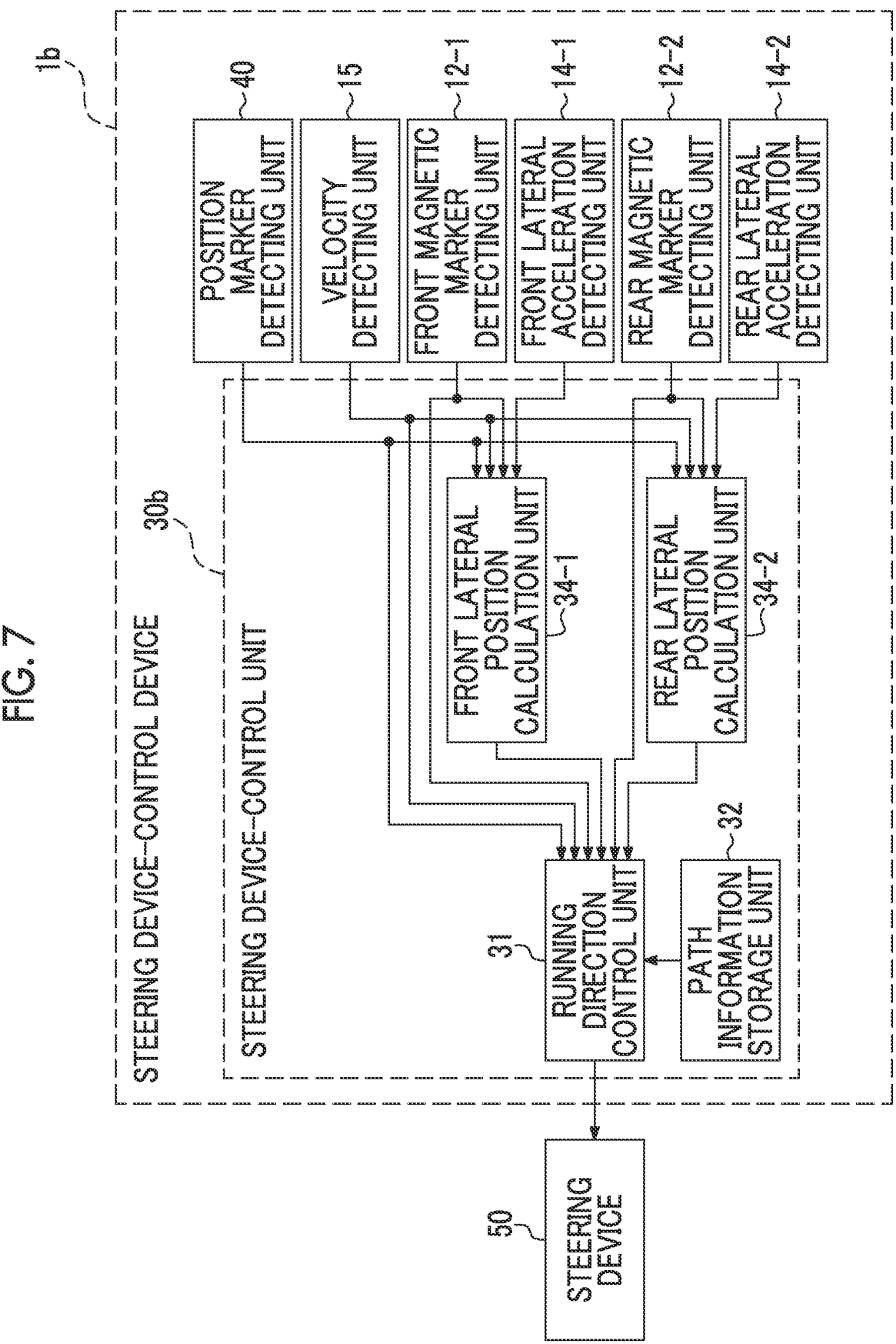
FIG. 7 is a block diagram showing a configuration example of a steering device-control device according to a second embodiment of the invention.
Figure 8A:
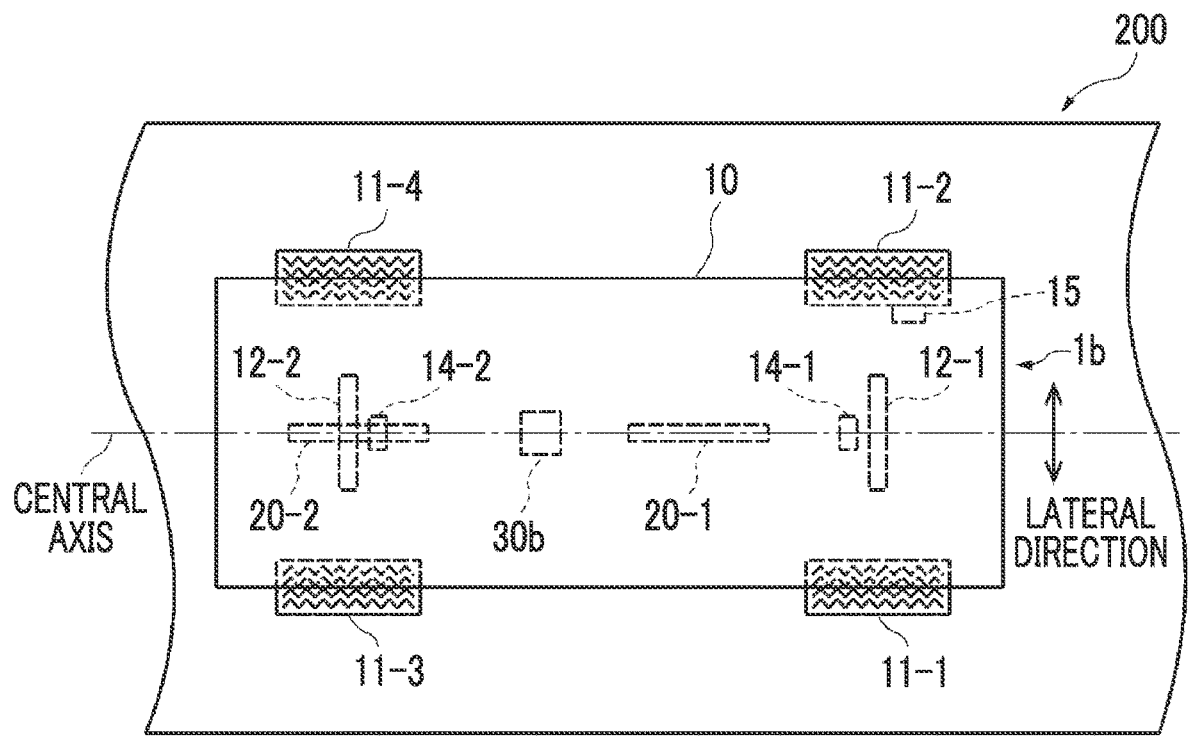
FIG. 8A is a schematic diagram showing an example in which a front lateral acceleration detecting unit 14-1 and the like shown in FIG. 7 are mounted in a vehicle 10.

Next, a second embodiment of the invention will be described with reference to FIGS. 7 to 10. FIG. 7 is a block diagram showing a configuration example of a steering device-control device 1b according to the second embodiment of the invention. FIG. 8A is a top view schematically showing an example in which a front lateral acceleration detecting unit 14-1 and the like shown in FIG. 7 are mounted in a vehicle 10, and FIG. 8B is a side view.

As shown in FIG. 7, the steering device-control device 1b according to the second embodiment includes a front lateral acceleration detecting unit 14-1 and a rear lateral acceleration detecting unit 14-2 instead of the front lateral velocity detecting unit 13-1 and the rear lateral velocity detecting unit 13-2 of the first embodiment shown in FIG. 1. Further, a steering device-control unit 30b of the second embodiment shown in FIG. 7 includes a front lateral position calculation unit 34-1 and a rear lateral position calculation unit 34-2 instead of the front lateral position calculation unit 33-1 and the rear lateral position calculation unit 33-2 of the first embodiment shown in FIG. 1. In the second embodiment, the steering device-control detects lateral acceleration using the front lateral acceleration detecting unit 14-1 and the rear lateral acceleration detecting unit 14-2, calculates a lateral velocity by integrating the lateral acceleration with respect to time, and calculates a lateral position by integrating the calculated lateral velocity with respect to time.

Figure 8B:
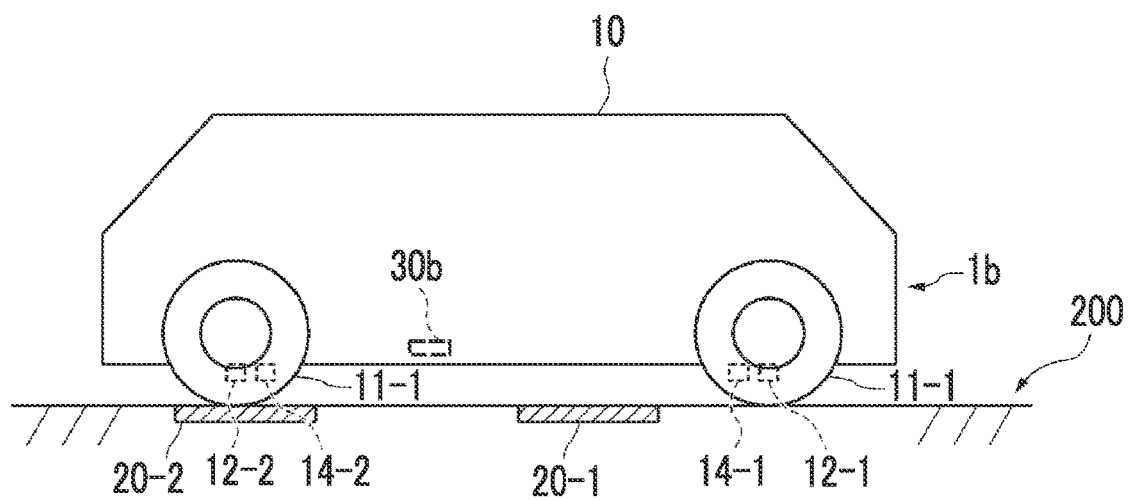
FIG. 8B is a schematic diagram showing the example in which the front lateral acceleration detecting unit 14-1 and the like shown in FIG. 7 are mounted in the vehicle 10.

The steering device-control device 1b shown in FIG. 7 is mounted on a vehicle 10 shown in FIGS. 8A and 8B, and controls the running direction of the vehicle 10 by controlling the steering angle of a steering device 50 (not shown in FIGS. 8A and 8B) that steers all or some of a plurality of tires 11-1 to 11-4 of the vehicle 10.

As shown in FIG. 7, the steering device-control device 1b includes the steering device-control unit 30b, a position marker detecting unit 40, a velocity detecting unit 15, a front magnetic marker detecting unit 12-1, the front lateral acceleration detecting unit 14-1, a rear magnetic marker detecting unit 12-2, and the rear lateral acceleration detecting unit 14-2. The steering device-control unit 30b is the same computer as the steering device-control unit 30; and includes a running direction control unit 31, a path information storage unit 32, a front lateral position calculation unit 34-1, and a rear lateral position calculation unit 34-2 as functional components that are formed of combinations of hardware and software, such as programs. In the following description, the front lateral position calculation unit 34-1 and the rear lateral position calculation unit 34-2 may be collectively referred to as lateral position calculation units 34. Portions different from those of the first embodiment will be described below.

The front lateral acceleration detecting unit 14-1 is formed using, for example, a single-axis or multi-axis acceleration sensor. The front lateral acceleration detecting unit 14-1 is installed on the front bottom portion of the vehicle 10 near the central axis of the vehicle 10, detects the lateral acceleration of the vehicle 10, and outputs the detected lateral acceleration. The rear lateral acceleration detecting unit 14-2 has the same configuration as the front lateral acceleration detecting unit 14-1, is installed on the rear bottom portion of the vehicle 10 near the central axis of the vehicle 10, detects the lateral acceleration of the vehicle 10, and outputs the detected lateral acceleration. However, the installation positions of the front lateral acceleration detecting unit 14-1 and the rear lateral acceleration detecting unit 14-2 are not limited to, for example, the bottom portion of the vehicle 10.

The front lateral position calculation unit 34-1 calculates the lateral position of the vehicle 10 on the basis of the detection result of the front magnetic marker detecting unit 12-1 in a case where the front magnetic marker detecting unit 12-1 detects the magnetic marker 20, calculates the lateral position of the vehicle 10 on the basis of the detection result of the front lateral acceleration detecting unit 14-1 in a case where the front magnetic marker detecting unit 12-1 does not detect the magnetic marker 20, and outputs the calculated lateral position. In a case where the front magnetic marker detecting unit 12-1 detects the magnetic marker 20, the front lateral position calculation unit 34-1 calculates the lateral position of the vehicle 10 on the basis of information about a position on the detection surface of the front magnetic marker detecting unit 12-1 at which the magnetic marker 20 is detected. Further, in a case where the front magnetic marker detecting unit 12-1 does not detect the magnetic marker 20, the front lateral position calculation unit 34-1 calculates the lateral velocity of the vehicle 10 by integrating the acceleration, which is detected by the front lateral acceleration detecting unit 14-1, with respect to time and calculates the lateral position of the vehicle 10 by integrating the calculated lateral velocity with respect to time.

Furthermore, as with the front lateral position calculation unit 34-1, the rear lateral position calculation unit 34-2 calculates the lateral position of the vehicle 10 on the basis of the detection result of the rear magnetic marker detecting unit 12-2 in a case where the rear magnetic marker detecting unit 12-2 detects the magnetic marker 20, calculates the lateral position of the vehicle 10 on the basis of the detection result of the rear lateral acceleration detecting unit 14-2 in a case where the rear magnetic marker detecting unit 12-2 does not detect the magnetic marker 20, and outputs the calculated lateral position.

The respective outputs of the position marker detecting unit 40, the velocity detecting unit 15, the front magnetic marker detecting unit 12-1, the rear magnetic marker detecting unit 12-2, the front lateral position calculation unit 34-1, and the rear lateral position calculation unit 34-2 are input to the running direction control unit 31; and the running direction control unit 31 determines the steering angle of the steering device 50 with reference to the path information stored in the path information storage unit 32 and outputs the determined steering angle to the steering device 50. In this case, the running direction control unit 31 determines a steering angle on the basis of the respective lateral positions of the vehicle 10 calculated by the front lateral position calculation unit 34-1 and the rear lateral position calculation unit 34-2 so that the lateral position becomes zero (so that a deviation of the central axis of the vehicle 10 from the central axis of the track 200 is eliminated); and controls the running direction of the vehicle 10.

Figure 9:
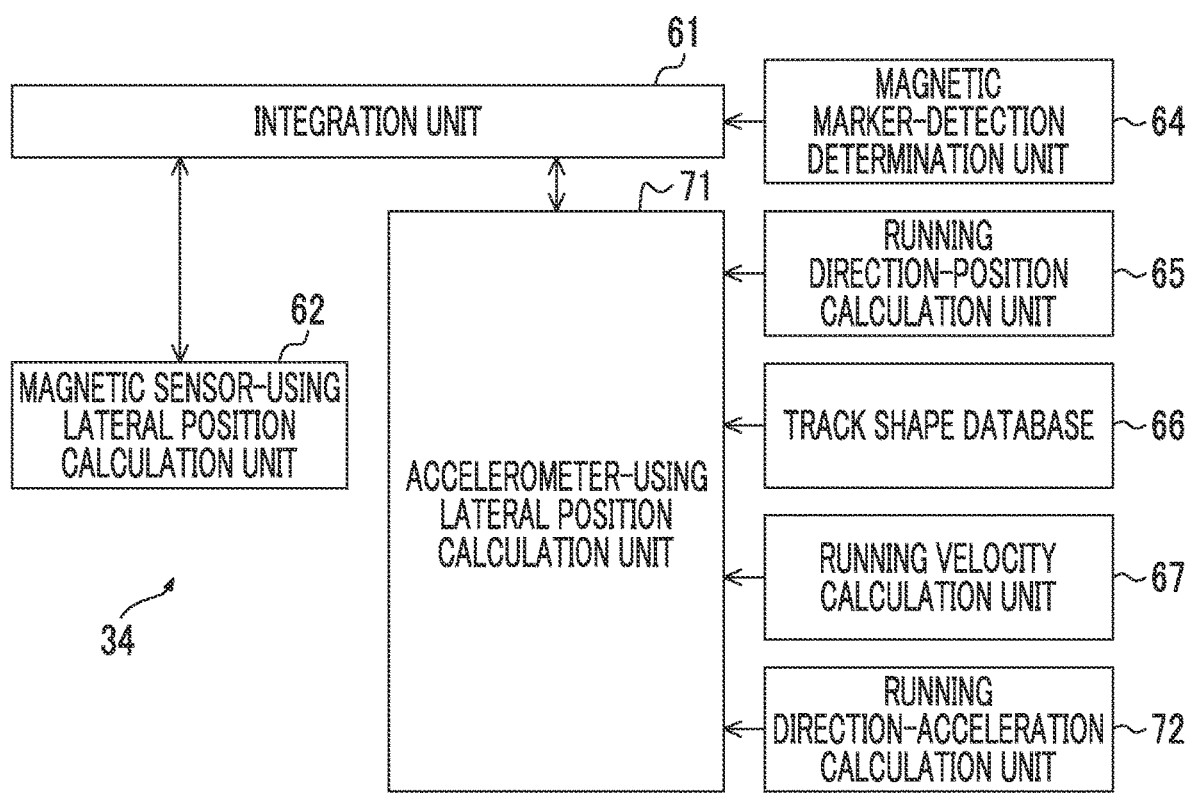
FIG. 9 is a block diagram showing a configuration example of a front lateral position calculation unit 34-1 and a rear lateral position calculation unit 34-2 shown in FIG. 7.
Figure 10:
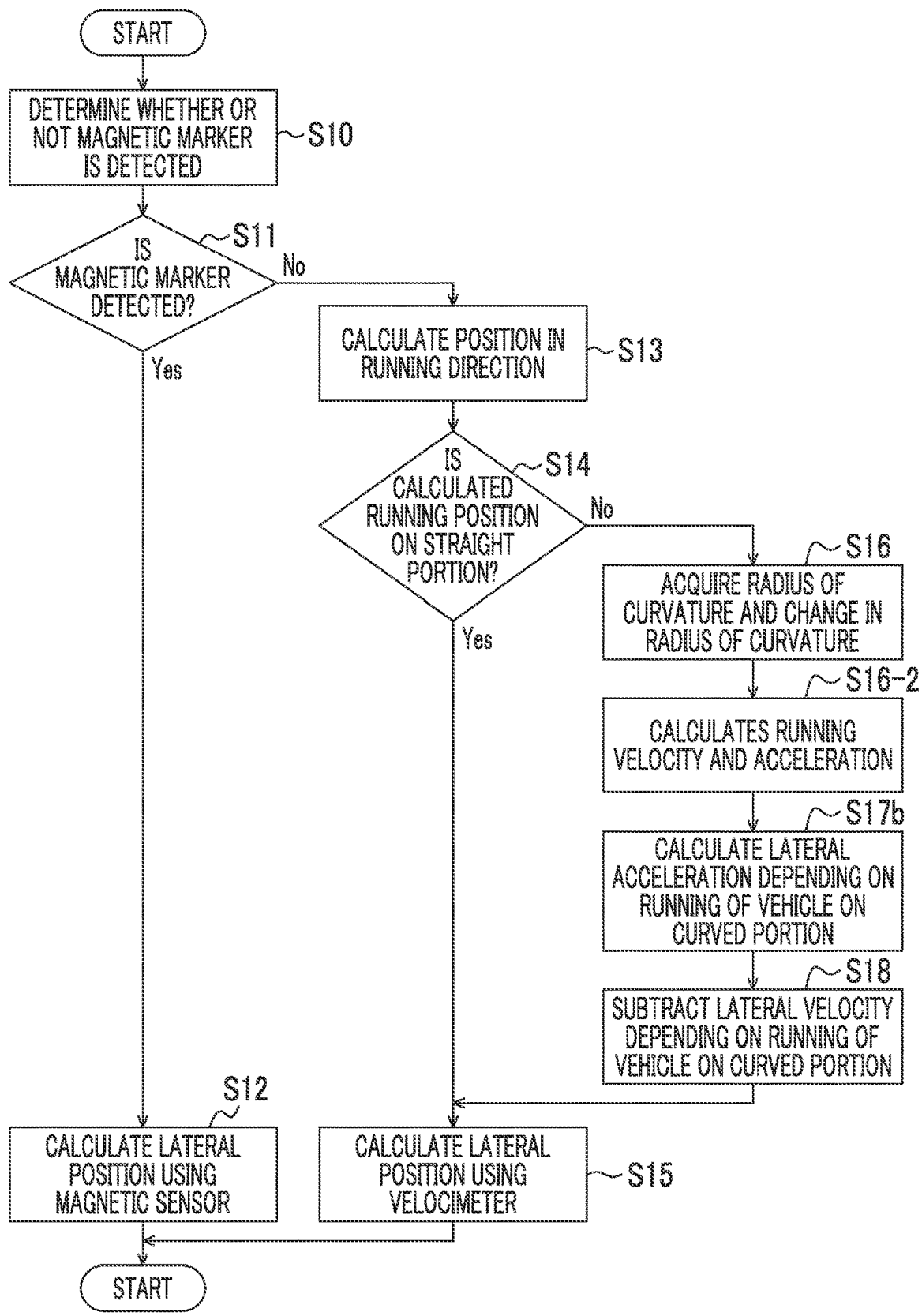
FIG. 10 is a flowchart showing an operation example of the front lateral position calculation unit 34-1 and the rear lateral position calculation unit 34-2 shown in FIG. 7.

Next, a configuration example and an operation example of the front lateral position calculation unit 34-1 and the rear lateral position calculation unit 34-2 (hereinafter, also collectively referred to as the lateral position calculation units 34) shown in FIG. 7 will be described with reference to FIGS. 9 and 10. FIG. 9 is a block diagram showing the configuration example of the front lateral position calculation unit 34-1 and the rear lateral position calculation unit 34-2 (the lateral position calculation units 34). FIG. 10 is a flowchart showing the operation example of the front lateral position calculation unit 34-1 and the rear lateral position calculation unit 34-2 (the lateral position calculation units 34) shown in FIG. 7.

Since lateral acceleration is generated on a curved portion of the track 200 even though crosswind is not generated, the lateral position calculation unit 34 shown in FIG. 9 performs processing for correcting the measured lateral acceleration using information about a position in the travel direction on the track 200. That is, the lateral position calculation unit 34 calculates the lateral position of the vehicle 10 by subtracting lateral acceleration, which depends on the running of the vehicle on the curved portion of the track 200, as necessary. In this case, the lateral position calculation unit 34 calculates lateral acceleration, which depends on the running of the vehicle on the curved portion of the track 200, on the basis of the radius of curvature of the curved portion of the track 200 and the running velocity of the vehicle 10; calculates a lateral velocity on the basis of the calculated lateral acceleration; and calculates the lateral position of the vehicle 10 by subtracting lateral acceleration, which depends on the running of the vehicle on the curved portion of the track 200, as necessary on the basis of the calculated lateral velocity.

In the example shown in FIG. 9, the lateral position calculation unit 34 includes an integration unit 61, a magnetic sensor-using lateral position calculation unit 62, an accelerometer-using lateral position calculation unit 71, a magnetic marker-detection determination unit 64, a running direction-position calculation unit 65, a track shape database 66, a running velocity calculation unit 67, and a running direction-acceleration calculation unit 72.

In a case where the magnetic marker 20 is detected on the basis of the determination result of the magnetic marker-detection determination unit 64, the integration unit 61 selects a lateral position calculated by the magnetic sensor-using lateral position calculation unit 62 and outputs the selected lateral position to the running direction control unit 31. In a case where the magnetic marker 20 is not detected, the integration unit 61 selects a lateral position calculated by the accelerometer-using lateral position calculation unit 71 and outputs the lateral position to the running direction control unit 31.

The accelerometer-using lateral position calculation unit 71 calculates a lateral velocity by integrating the lateral acceleration with respect to time on the basis of the output of the front lateral acceleration detecting unit 14-1 or the rear lateral acceleration detecting unit 14-2 (hereinafter, also collectively referred to as a lateral acceleration detecting unit 14), calculates the lateral position of the vehicle 10 by integrating the calculated lateral velocity with respect to time, and outputs the calculated lateral position. In this case, the accelerometer-using lateral position calculation unit 71 calculates the lateral position of the vehicle 10 by subtracting lateral acceleration, which depends on the running of the vehicle on the curved portion of the track 200, as necessary with reference to the track shape database 66 on the basis of the output of the running direction-position calculation unit 65, the output of the running velocity calculation unit 67, and the output of the running direction-acceleration calculation unit 72.

The running direction-acceleration calculation unit 72 calculates the acceleration (for example, average acceleration) of the vehicle 10 in the running direction at a predetermined time by differentiating the velocity in the running direction, which is detected by the velocity detecting unit 15, with respect to time on the basis of the output of the velocity detecting unit 15.

Next, the operation example of the lateral position calculation unit 34 shown in FIG. 9 will be described with reference to FIG. 10. Processing shown in FIG. 10 is repeatedly performed at predetermined time intervals. In a case where the processing shown in FIG. 10 is started, the magnetic marker-detection determination unit 64 of the lateral position calculation unit 34 determines whether or not the magnetic marker 20 is detected on the basis of the output of the magnetic marker detecting unit 12 (Step S10).

In a case where the magnetic marker 20 is detected (in the case of "Yes" in Step S11), the magnetic sensor-using lateral position calculation unit 62 calculates the lateral position of the vehicle 10 on the basis of the output of the magnetic marker detecting unit 12 and outputs the calculated lateral position (Step S12).

On the other hand, in a case where the magnetic marker 20 is not detected (in the case of "No" in Step S11), the running direction-position calculation unit 65 calculates the running position of the vehicle 10 (Step S13). After that, the accelerometer-using lateral position calculation unit 71 determines whether or not the calculated running position is on a straight line with reference to the track shape database 66 on the basis of the calculated running position (Step S14). In a case where the calculated running position is on the straight line (in the case of "Yes" in Step S14), the accelerometer-using lateral position calculation unit 71 calculates the lateral position of the vehicle 10 on the basis of the output of the lateral acceleration detecting unit 14 and outputs the calculated lateral position (Step S15).

On the other hand, in a case where the calculated running position is not on the straight line (in the case of "No" in Step S14), the accelerometer-using lateral position calculation unit 71 unit acquires information representing a radius of curvature and a change in a radius of curvature from the track shape database 66 on the basis of the calculated running position (Step S16). After that, the running velocity calculation unit 67 calculates a running velocity and the running direction-acceleration calculation unit 72 calculates acceleration in the running direction (Step S16-2). Then, the accelerometer-using lateral position calculation unit 71 calculates lateral acceleration that depends on the running of the vehicle on the curved portion (Step S17b).

In Step S17b, the accelerometer-using lateral position calculation unit 71 calculates lateral acceleration, which is generated on the curved portion, as follows in the same way as in a case where a velocity to be generated on the curved portion is calculated in the first embodiment.

That is, the accelerometer-using lateral position calculation unit 71 calculates acceleration ae, which is to be obtained in a case where the vehicle passes along a curve, from the following expression. The acceleration ae is as follows.

$$a_\theta = \left(\frac{dr}{dq} - \frac{l}{r}\right) \cdot a - \frac{v^2}{r}$$

In a case where a position on the track is known, a change dr/dq in a radius of curvature and a radius r of curvature can be obtained and a running velocity v and acceleration a in the running direction can also be calculated. Accordingly, the lateral acceleration ae can be calculated from the above expression.

As described above, according to the second embodiment, a lateral position can be detected without the use of an optical camera as in the first embodiment. Therefore, a lateral position can be accurately detected even in rainy weather, dense fog, and the like. Further, since there is a degree of freedom in a location where an accelerometer is to be mounted in the second embodiment as compared to the first embodiment, an accelerometer is easily mounted. Furthermore, according to the second embodiment, as in the first embodiment, a change in a lateral position caused by crosswind can be calculated even in rainy weather and the like and on a curved portion.

The embodiments of the invention have been described above with reference to the drawings, but specific configuration is not limited to the above-mentioned embodiments and also includes design changes and the like without departing from the scope of the invention. For example, a lateral velocity or lateral acceleration to be subtracted on the curved portion of the track 200 may be a value determined in advance on the basis of a position on the track (a value calculated in advance on the basis of a command value of a running velocity and the shape of the track) instead of being sequentially calculated on the basis of the detection result of a running velocity or acceleration in the running direction. Further, the vehicle 10 has been used as an example of the running body in the above-mentioned embodiments, but a hovercraft, which is a ship floating and running using wind pressure, or the like may be used as the running body.

The steering device-control devices 1 and 1b are examples of a control device of the invention. The front magnetic marker detecting unit 12-1 and the rear magnetic marker detecting unit 12-2 (the magnetic marker detecting units 12) are examples of a first sensor of the invention. The front lateral velocity detecting unit 13-1 and the rear lateral velocity detecting unit 13-2 (the lateral velocity detecting units 13) and the front lateral acceleration detecting unit 14-1 and the rear lateral acceleration detecting unit 14-2 (the lateral acceleration detecting units 14) are examples of a second sensor of the invention. The magnetic sensor-using lateral position calculation unit 62 is an example of a first lateral position calculation unit of the invention. The velocimeter-using lateral position calculation unit 63 and the accelerometer-using lateral position calculation unit 71 are examples of a second lateral position calculation unit of the invention.

<Configuration of Computer>

Figure 11:
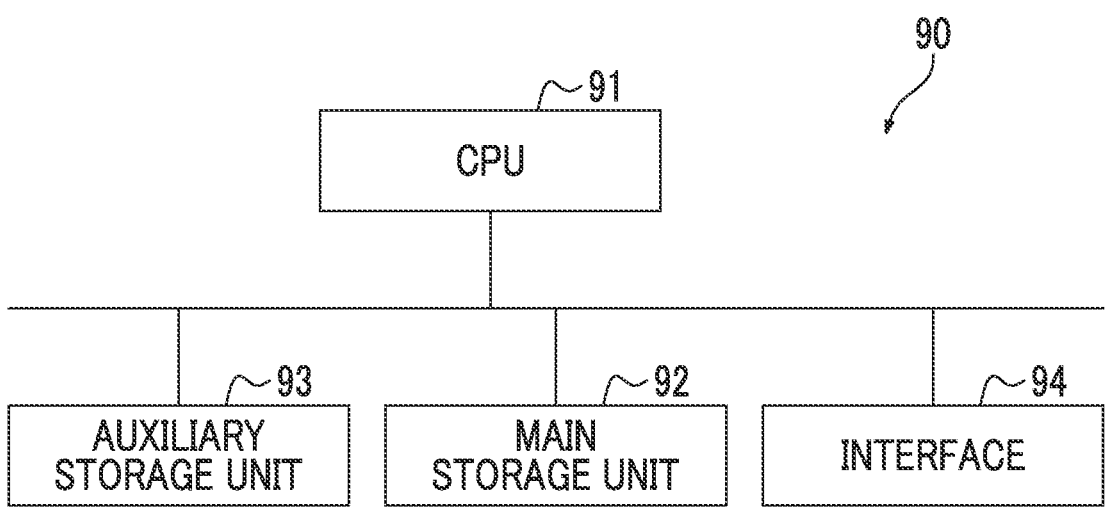
FIG. 11 is a schematic block diagram showing a configuration of a computer according to at least one embodiment.

FIG. 11 is a schematic block diagram showing a configuration of a computer according to at least one embodiment.

A computer 90 includes a processor 91, a main memory 92, a storage 93, and an interface 94.

Each of the above-mentioned steering device-control units 30 and 30b is mounted on the computer 90. Further, the operation of each processing unit described above is stored in the storage 93 in the form of a program. The processor 91 reads a program from the storage 93, loads the program in the main memory 92, and performs the above-mentioned processing according to the program. Furthermore, the processor 91 secures a storage area, which corresponds to each storage unit described above, in the main memory 92 according to the program.

The program may be to realize some of functions to be fulfilled by the computer 90. For example, the program may be to fulfill a function in combination with another program already stored in the storage or another program installed in another device. In another embodiment, a computer may include a custom large scale integrated circuit (LSI), such as a programmable logic device (PLD), in addition to the above-mentioned configuration or instead of the above-mentioned configuration. Examples of PLD include programmable array logic (PAL), generic array logic (GAL), a complex programmable logic device (CPLD), and a field programmable gate array (FPGA). In this case, some or all of functions to be fulfilled by the processor may be fulfilled by the integrated circuit.

Examples of the storage 93 include a Hard Disk Drive (HDD), a Solid State Drive (SSD), a magnetic disk, a magneto-optical disk, a compact disc read only memory (CD-ROM), a digital versatile disc read only memory (DVD-ROM), a semiconductor memory, and the like. The storage 93 may be an internal medium that is directly connected to a bus of the computer 90, or may be an external medium that is connected to the computer 90 through the interface 94 or a communication line. Further, in a case where this program is delivered to the computer 90 through the communication line, the computer 90 to which the program is delivered may load the program in the main memory 92 and may perform the processing. In at least one embodiment, the storage 93 is a non-temporary storage medium.

INDUSTRIAL APPLICABILITY

According to the respective aspects of the invention, it is possible to detect a lateral position even in rainy weather, dense fog, and the like.

REFERENCE SIGNS LIST 1, 1b: steering device-control device
10: vehicle
12-1: front magnetic marker detecting unit
12-2: rear magnetic marker detecting unit
13-1: front lateral velocity detecting unit
13-2: rear lateral velocity detecting unit
14-1: front lateral acceleration detecting unit
14-2: rear lateral acceleration detecting unit
20-1, 20-2: magnetic marker
31: running direction control unit
50: steering device
62: magnetic sensor-using lateral position calculation unit
63: velocimeter-using lateral position calculation unit
71: accelerometer-using lateral position calculation unit
200: track

The invention claimed is:

1. A control device that controls a running direction of a running body running along a plurality of magnetic markers arranged at intervals on a track, the control device comprising:
a first sensor that detects the magnetic marker;
a second sensor that detects at least one of a velocity or an acceleration of the running body;
a first lateral position calculation unit that calculates a lateral deviation of the running body from a central axis of the track on the basis of a detection result of the first sensor in a case where the first sensor detects the magnetic marker;
a second lateral position calculation unit that calculates the lateral deviation of the running body on the basis of a detection result of the second sensor in a case where the first sensor does not detect the magnetic marker;
wherein the second lateral position calculation unit calculates the lateral deviation of the running body by subtracting at least one of a lateral velocity or a lateral acceleration that depends on running of the running body on a curved portion of the track, and
wherein the second lateral position calculation unit calculates the at least one of the lateral velocity or the lateral acceleration that depends on running of the running body on the curved portion by referencing a track shape database in which each position on the track and information on the curved portion with respect to the each position are stored in association with each other in advance, and using the information on the curved portion corresponding to a running position of the running body; and a running direction control unit that controls the running direction of the running body on the basis of the lateral deviation of the running body calculated by either the first lateral position calculation unit or the second lateral position calculation unit.

2. A moving body comprising:

the control device according to claim 1.

3. The control device according to claim 1, wherein the second lateral position calculation unit calculates a lateral velocity or lateral acceleration, which depends on running of the running body on a curved portion of the track, on the basis of a radius of curvature of the curved portion of the track and a running velocity of the running body, and calculates the lateral deviation of the running body by subtracting the calculated lateral velocity or the calculated lateral acceleration.

4. A moving body comprising:

the control device according to claim 3.

5. A control method of controlling a running direction of a running body running along a plurality of magnetic markers arranged at intervals on a track, in which the running body including a first sensor that detects the magnetic marker, a second sensor that detects at least one of a velocity or an acceleration of the running body, a first lateral position calculation unit that calculates a lateral deviation of the running body from a central axis of the track on the basis of a detection result of the first sensor in a case where the first sensor detects the magnetic marker, a second lateral position calculation unit that calculates the lateral deviation of the running body on the basis of a detection result of the second sensor in a case where the first sensor does not detect the magnetic marker, and a running direction control unit, wherein the second lateral position calculation unit calculates the lateral deviation of the running body by subtracting at least one of a lateral velocity or a lateral acceleration that depends on running of the running body on a curved portion of the track, and wherein the second lateral position calculation unit calculates the at least one of the lateral velocity or the lateral acceleration that depends on running of the running body on the curved portion by referencing a track shape database in which each position on the track and information on the curved portion with respect to the each position are stored in association with each other in advance, and using the information on the curved portion corresponding to a running position of the running body, the control method comprising:

controlling the running direction of the running body by the running direction control unit on the basis of the lateral deviation of the running body calculated by either the first lateral position calculation unit or the second lateral position calculation unit.

6. A control method of controlling a running direction of a running body running along a plurality of magnetic markers arranged at intervals on a track, comprising:

preparing the running body to include a first sensor that detects the magnetic marker, a second sensor that detects at least one of a velocity or an acceleration of the running body, a first lateral position calculation unit that calculates a lateral deviation of the running body from a central axis of the track on the basis of a detection result of the first sensor in a case where the first sensor detects the magnetic marker, a second lateral position calculation unit that calculates the lateral deviation of the running body on the basis of a detection result of the second sensor in a case where the first sensor does not detect the magnetic marker, and a running direction control unit, wherein the second lateral position calculation unit calculates the lateral deviation of the running body by subtracting at least one of a lateral velocity or a lateral acceleration that depends on running of the running body on a curved portion of the track, and wherein the second lateral position calculation unit calculates the at least one of the lateral velocity or the lateral acceleration that depends on running of the running body on the curved portion by referencing a track shape database in which each position on the track and information on the curved portion with respect to the each position are stored in association with each other in advance, and using the information on the curved portion corresponding to a running position of the running body, and controlling the running direction of the running body by the running direction control unit on the basis of the lateral position of the running body calculated by either the first lateral position calculation unit or the second lateral position calculation unit.

\* \* \* \* \*